US010491492B2

(12) United States Patent
Nakazawa

(10) Patent No.: US 10,491,492 B2
(45) Date of Patent: Nov. 26, 2019

(54) INFORMATION PROCESSING TERMINAL AND CONTROL METHOD

(71) Applicant: CANON KABUSHIKI KAISHA, Tokyo (JP)

(72) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 14/693,371

(22) Filed: Apr. 22, 2015

(65) Prior Publication Data

US 2015/0312122 A1    Oct. 29, 2015

(30) Foreign Application Priority Data

Apr. 25, 2014   (JP) ................................. 2014-091809

(51) Int. Cl.
*G06F 15/173*    (2006.01)
*H04L 12/26*     (2006.01)
(Continued)

(52) U.S. Cl.
CPC ...... *H04L 43/0811* (2013.01); *G06F 9/44505* (2013.01); *G06F 16/22* (2019.01);
(Continued)

(58) Field of Classification Search
CPC ............. H04L 43/0811; H04L 67/1055; G06F 9/44505; G06F 17/30312; H04M 1/72561; H04M 1/72577
See application file for complete search history.

(56) References Cited

U.S. PATENT DOCUMENTS 9,237,113 B2 *   1/2016   Lee ..................... H04L 67/2861
2008/0222628 A1*  9/2008   Batra ........................ G06F 8/60
                                                                717/171
(Continued)

FOREIGN PATENT DOCUMENTS

JP    2007-181178 A    7/2007
JP    2008-193546 A    8/2008
(Continued)

OTHER PUBLICATIONS

Syunpei Shiraishi, "An Introduction to HTML 5 & API", Nikkei BP, Inc., 1st Edition, pp. 205-220, Mar. 1, 2010 (with partial English translation).

(Continued)

*Primary Examiner* — Chirag R Patel
*Assistant Examiner* — Rachel J Hackenberg
(74) *Attorney, Agent, or Firm* — Canon U.S.A., Inc. IP Division

(57) ABSTRACT

An information processing terminal on which a web browser operates includes a setting unit configured to set a limitation condition for limiting transmission of local storage data to a web server providing a web application, and a determination unit configured to determine a value indicating a status of network connection of the information processing terminal in accordance with the set limitation condition when the status of the network connection of the information processing terminal is online. Even when the status of the network connection of the information processing terminal is online, the transmission of the local storage data to the web server from the web application is limited in accordance with the determined value.

19 Claims, 10 Drawing Sheets

(51) Int. Cl.
*G06F 16/22* (2019.01)
*G06F 9/445* (2018.01)
*H04L 29/08* (2006.01)
*H04M 1/725* (2006.01)
*H04W 52/02* (2009.01)

(52) U.S. Cl.
CPC .......... *H04L 67/02* (2013.01); *H04L 67/1055* (2013.01); *H04M 1/72561* (2013.01); *H04M 1/72577* (2013.01); *H04M 2250/06* (2013.01); *H04W 52/0261* (2013.01); *Y02D 70/1262* (2018.01); *Y02D 70/142* (2018.01); *Y02D 70/166* (2018.01)

(56) References Cited

U.S. PATENT DOCUMENTS

| | | | | |
|---|---|---|---|---|
| 2014/0173707 | A1* | 6/2014 | Hollander | H04L 63/10 726/7 |
| 2014/0365673 | A1* | 12/2014 | Vyas | H04L 65/1069 709/228 |
| 2015/0244794 | A1* | 8/2015 | Poletto | H04L 67/1085 715/748 |
| 2016/0188181 | A1* | 6/2016 | Smith | G06F 3/048 715/765 |

FOREIGN PATENT DOCUMENTS

| | | |
|---|---|---|
| JP | 2014-036410 A | 2/2014 |
| JP | 2014-091809 | 3/2018 |
| WO | 2012/112404 A2 | 8/2012 |
| WO | 2013/099466 A1 | 7/2013 |
| WO | 2014/20916 A1 | 2/2014 |
| WO | 2014/024917 A1 | 2/2014 |

OTHER PUBLICATIONS

Kraig Brockschmidt, "Programming using HTML, CSS and JavaScript/Windows® Store", Nikkei BP, Inc., 1st Edition, pp. 671-698, Sep. 30, 2013(with partial English translation).

* cited by examiner

INFORMATION PROCESSING TERMINAL AND CONTROL METHOD

BACKGROUND OF THE INVENTION

Field of the Invention

The present invention relates to a technique for providing a new mechanism of a data storage for a web browser in Hyper Text markup Language (HTML) 5.

Description of the Related Art

Various extended functions in HTML5 have been developed in response to advancement of functions of a web application. In particular, a wide variety of extended functions have been provided for operating the web application offline, due to the wide spread use of information processing terminals such as smartphones and tablets.

Examples of such an extended function include an application cache function of caching a file on a web server, in a storage area for a web browser, functions such as WebStorage and IndexedDB for storing data in the storage area for the web browser, and functions such as File System API for operating a file in the storage area for the web browser. Furthermore, a mechanism has been proposed for managing a connection status (online/offline) of an information processing terminal on which the web browser operates, to a network in such a manner that the connection status can be referred to by a web application, and notifying the web application of changes in the status. The mechanism for storing files and data in the storage area (local storage) for the web browser, including the extended functions described above, is referred to as a local storage function below.

For example, a conventional method of connecting an information processing terminal to a network includes a technique discussed in Japanese Patent Application Laid-Open No. 2007-181178. Specifically, in Japanese Patent Application Laid-Open No. 2007-181178, an information processing terminal connects to a wireless local area network (LAN) and displays a screen for recommending connection through the mobile communications, in accordance with the remaining battery. Furthermore, in Japanese Patent Application Laid-Open No. 2007-181178, a communication terminal executes a predetermined power saving operation when the remaining amount of the battery is small.

The local storage function and the function of referring to and providing notification of the connection status to the network as the extended functions of the web browser described above, are used for supporting an operation of the web application (or website) when the information processing terminal is "offline" and thus is not connected to the network. For example, a display related to the web application is controlled in the web browser, as in the status where the connection to the network is established, by using data and files stored in the local storage in advance, even when the information processing terminal is offline. When the information processing terminal is online, the web application transmits data stored in the local storage to the web server providing the web application on the network (synchronization).

In the technique described above, the type of the communications, performed in the network connection when the information processing terminal is online, is not taken into consideration. Thus, for example, the data might be automatically transmitted to the web server even when the type of communications performed in the connection in the online status is mobile communications involving usage based rate or communications with an upper limit amount. Communication control might not be performed just as the user has desired in such a case. There might be a user who wants to limit the data transmission in accordance with the connection status depending on the web application (website) for example, for the types of communications other than those described above.

SUMMARY OF THE INVENTION

Thus, the present invention is directed to a mechanism for achieving appropriate control corresponding to a connection status, while fully considering the user's will represented by a communication type and the like for using the functions of a web browser described above.

According to an aspect of the present invention, there is provided an information processing terminal on which a web browser having a function of storing data related to a web application as local storage data in a storage area for the web browser operates. The information processing terminal includes a setting unit configured to set a limitation condition for limiting transmission of the local storage data to a web server providing the web application, and a determination unit configured to determine a value indicating a status of network connection of the information processing terminal in accordance with the set limitation condition when the status of the network connection of the information processing terminal is online. Even when the status of the network connection of the information processing terminal is online, the transmission of the local storage data to the web server from the web application is limited in accordance with the determined value.

According to another aspect of the present invention, there is provided a control method for a web browser having a function of storing data related to a web application in a storage area prepared for a storage device for the web browser. The control method includes setting a limitation condition for limiting transmission of update data related to the web application in the storage area to a server providing the web application, and determining a value indicating a status of network connection of a information processing terminal in accordance with the set limitation condition when the status of the network connection of the information processing terminal is online. Even if the status of the network connection of the information processing terminal is online, the transmission of the update data to the server from the information processing terminal is limited in accordance with the determined value.

Further features of the present invention will become apparent from the following description of embodiments with reference to the attached drawings.

DESCRIPTION OF THE EMBODIMENTS

Embodiments of the present invention are described with reference to the drawings.

Figure 10:
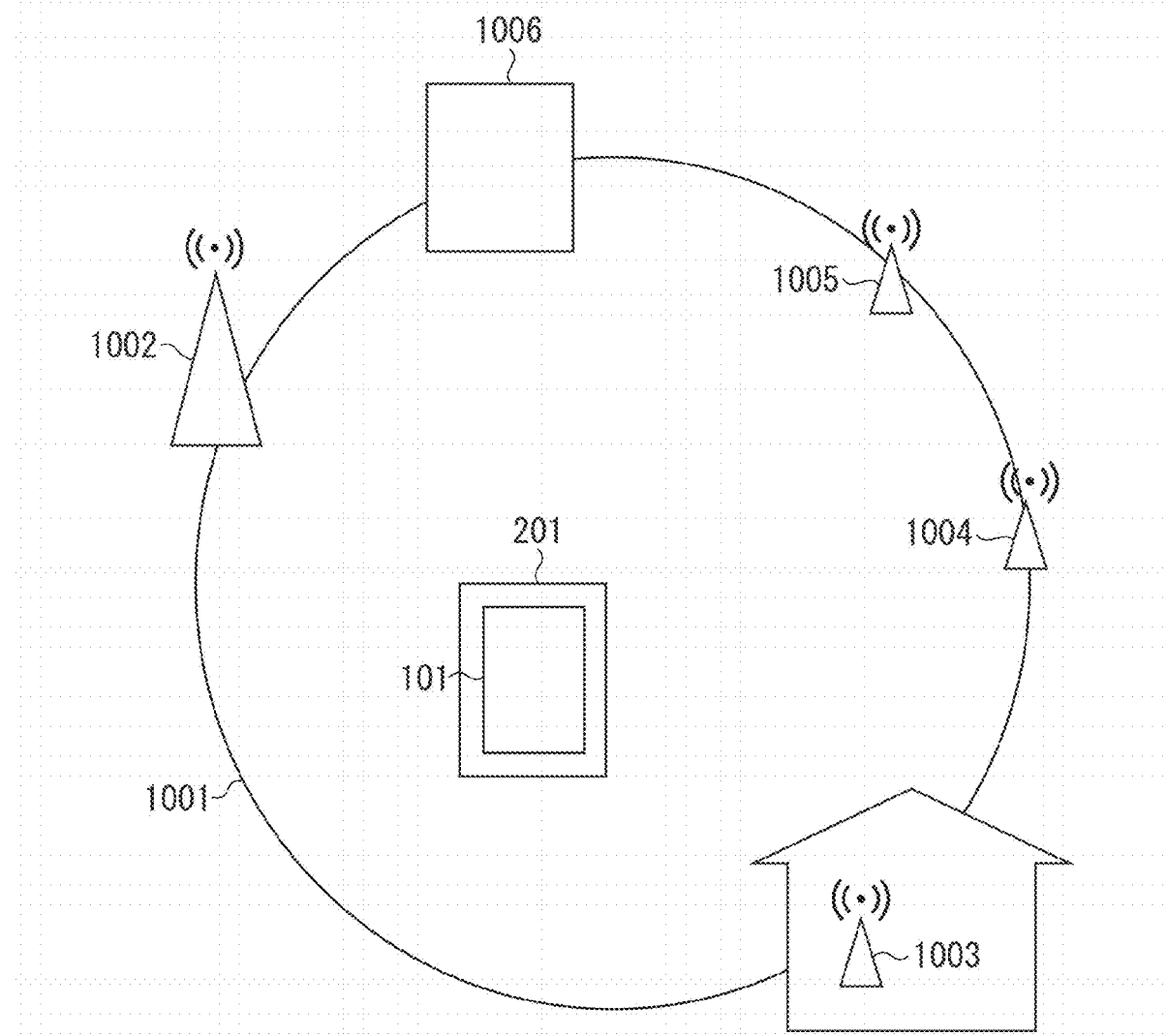
FIG. 10 is a diagram illustrating an example of a configuration of a network system according to the present invention.

A first embodiment is described. FIG. 10 illustrates an example of a network structure that can be provided by the present invention. FIG. 10 illustrates an information processing terminal 201 as a smartphone, a tablet, or the like, a web browser 101 that operates on the terminal, an Internet network 1001, and a base station 1002 for mobile communications with 3G, Long Term Evolution (LTE) or the like. The information processing terminal 201 connects to the Internet network 1001 through the base station 1002 to perform mobile communications. Access points 1003, 1004, and 1005 are Wireless Fidelity (WiFi) access points. The access point 1003 is a WiFi access point in a home of an owner of the information processing terminal 201. Both the access points 1004 and 1005 are public WiFi access points. The access point 1004 involves charging based on a communication amount. The access point 1005 can be used for free or with flat-rate pricing unrelated to the communication amount. The information processing terminal 201 connects to the Internet network 1001 through the access points 1003 to 1005 to perform WiFi communications. A web server 1006 provides a web application (or website). The web browser 101 connects to the web server 1006 on the Internet network 1001 through the base station 1002 for the mobile communications or the WiFi access points 1003 to 1005.

Figure 1:
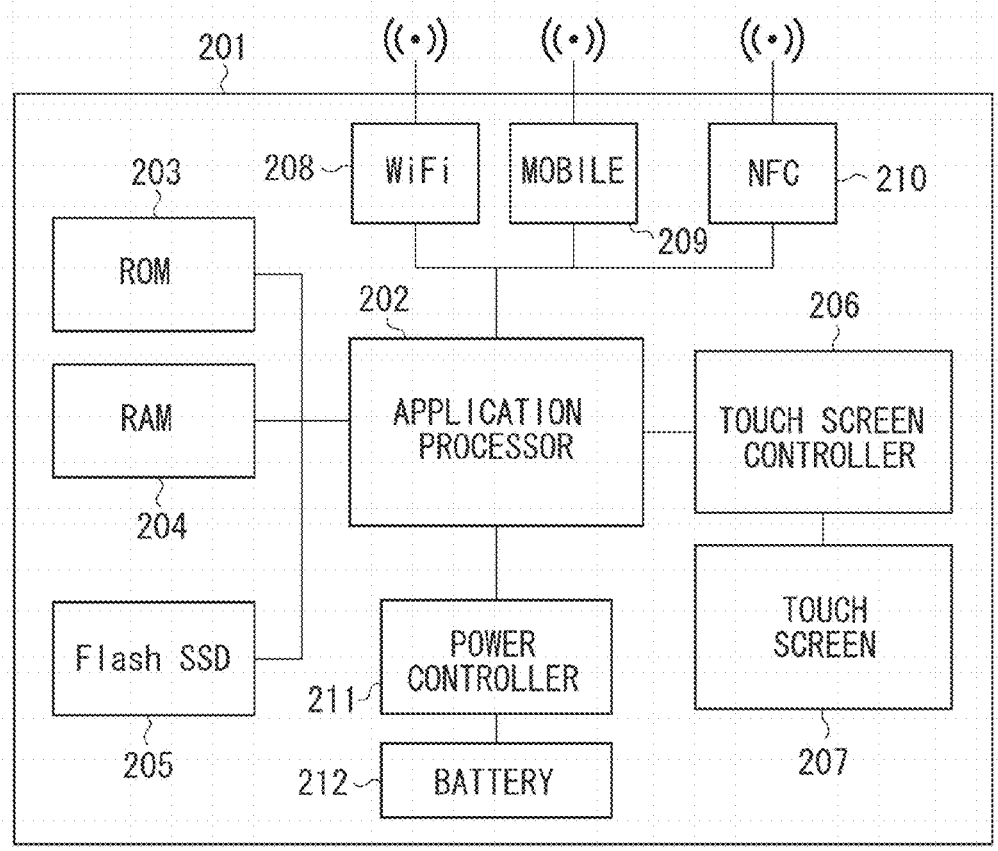
FIG. 1 is a block diagram illustrating an example of a hardware configuration of an information processing terminal.

FIG. 1 is a block diagram illustrating an example of a hardware configuration of the information processing terminal 201 on which the web browser 101 can operate.

In FIG. 1, the information processing terminal 201 includes an application processor (AP) 202, a read only memory (ROM) 203, a random access memory (RAM) 204, a storage device 205 formed of a Flash solid state drive (SSD), and the like. The AP 202 executes software stored in the ROM 203 or the storage device 205, and performs overall control on the devices connected to the AP 202. The RAM 204 functions as a main memory or a work area for the AP 202. The storage device 205 includes a flash memory and the like, and stores an operating system (OS), various applications such as a web browser, a database, a user file, and the like. A touchscreen controller 206 controls a touchscreen 207 connected thereto.

A wireless LAN control unit 208, a mobile communication control unit 209, and a near field communication control unit 210 respectively control wireless LAN communications such as WiFi communications and the like, mobile communications, and near field communications. A power source control unit 211 performs charge control, remaining battery management, and the like for a rechargeable battery 212.

Figure 2:
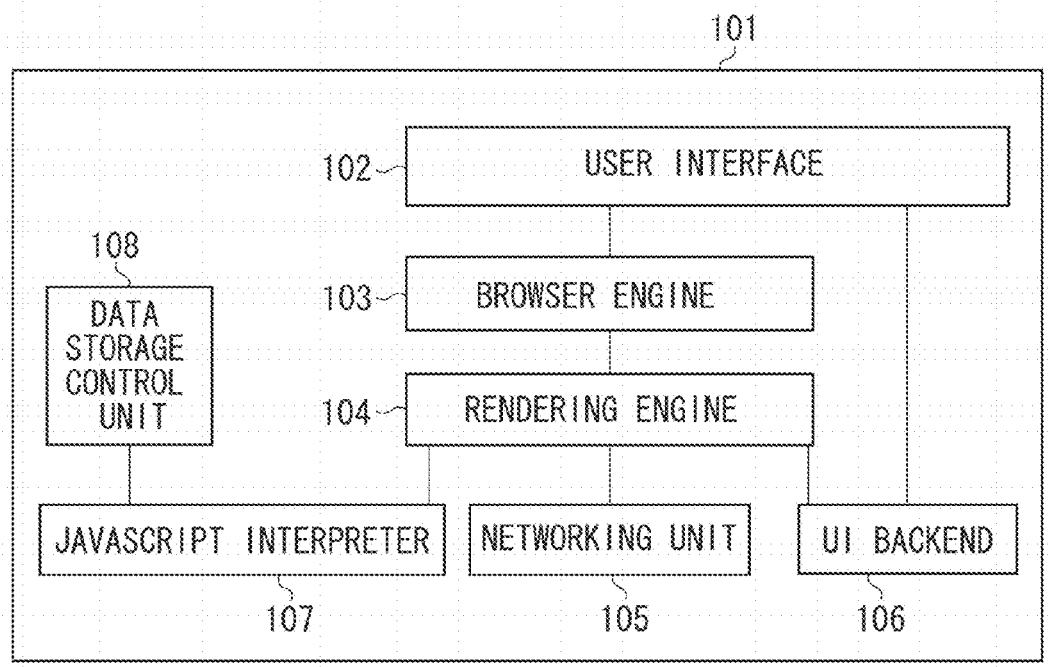
FIG. 2 is a block diagram illustrating an example of a configuration of a web browser.

FIG. 2 is a block diagram illustrating an example of a configuration of the web browser 101.

A user interface (UI) 102 controls setting of the web browser 101, and a display and an operation for a control button, uniform resource locator (URL), and the like. A rendering engine 104 displays a requested content. When an HTML content is requested, the rendering engine 104 analyzes the HTML and cascading style sheets (CSS), and displays the resultant content on a screen. A browser engine 103 adjusts processing executed between the UI 102 and the rendering engine 104. A networking unit 105 is used for a Hypertext Transfer Protocol (HTTP) request and the like for calling a network. A UI backend 106 is used for drawing basic widgets such as a combo box and a window. The UI backend 106 provides a general interface that does not depend on a platform, and calls a drawing method unique to an OS based on the interface. A JavaScript (registered trademark) interpreter (JS interpreter) 107 is used for analyzing and executing a JavaScript (registered trademark) code. The interpreter 107 includes a JavaScript (registered trademark) executing unit that does not depend on a platform and a unit that accesses network information, including positional information and online information and the like. A data storage control unit 108 performs control for storing in the storage device 205 a file and data based on a specification of a storage function as a result of extension for a cookie and HTML5. The data based on the specification of the storage function includes local storage data such as localStorage, file system, and IndexedDB and an application cache.

When the user operates the UI 102 to call a website, the data storage control unit 108 stores data, instructed from the website side, in a predetermined storage area in the storage device 205, prepared for the web browser 101. Specifically, data storage control starts when the web browser 101 requests a page provided by a website. Before starting to store the data, the web browser 101 may issue a notification to check with the user. Now, a mechanism for storing the data, from the website side, by the web browser 101 is described.

A case of the local storage data described above is described. The JavaScript (registered trademark) code is executed by the JS interpreter 107, when the web application is used through the web browser 101. When the JavaScript (registered trademark) code is executed, data downloaded from the web server 1006 providing the website, is stored by the data storage control unit 108. The data thus stored can be used through the web browser 101 or may have the value edited and stored again, even when the information processing terminal 201 goes offline. When the JavaScript (registered trademark) code includes a command related to synchronization, the data, including the value edited while the information processing terminal 201 is offline, is transmitted from the web browser 101 to the web server 1006 when the information processing terminal 201 goes online.

A case of the application cache is described. The web browser 101 attempts to acquire required files and data, from the web server 1006, and store the files and data in a storage area for the web browser 101 in accordance with the description of a manifest file prepared by the web application (website side). The manifest file is downloaded by the web browser 101 when the website is called (when a page is requested).

The manifest file includes information clearly designating a resource stored in the storage area of the web browser 101 after the manifest file is downloaded through the first access to the website, and further includes information designating a resource that requires connection to the web server 1006 and the like.

Thus, even when the connection status to the network changes to offline, the web application can be executed by using cache data managed by the web browser 101. Work data, generated when the terminal is offline, is synchronized with data on the web server 1006 on reconnection to the network.

Figure 3A:
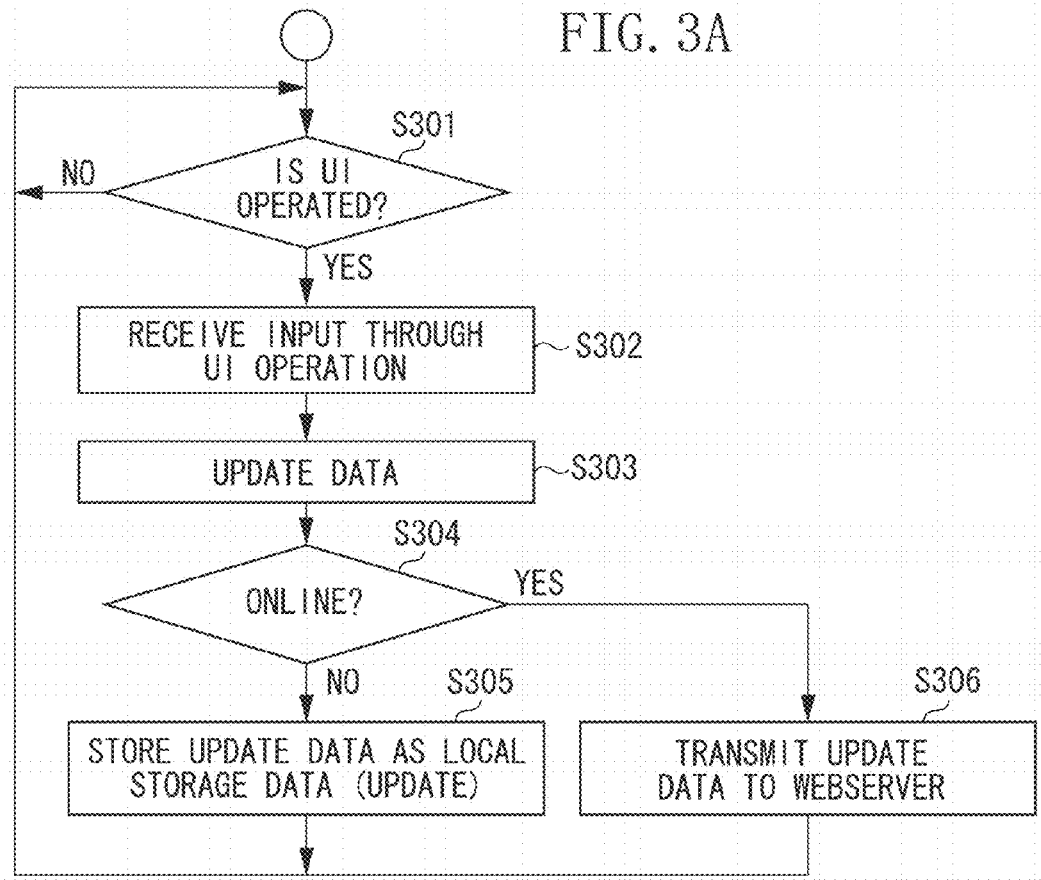
FIGS. 3A and 3B are flowcharts illustrating processing of communication control corresponding to a connection status of the web browser.

FIG. 3A is a flowchart illustrating processing of storing the local storage data and the application cache, executed by the web browser 101 in accordance with an operation of the web application.

When an operation through the UI 102 of the web browser 101 is detected in step S301 (Yes in step S301), the web application receives an input of the UI operation in step S302. Then, in step S303, the web application updates internal data in accordance with the UI operation. In step S304, the web application determines the connection status of the information processing terminal 201 to the network through the web browser 101. The processing proceeds to step S305 when the status is an offline status (No is step S304), and proceeds to step S306 when the status is an online status (Yes in step S304). In step S305, the web application performs control so that the update data, obtained in step S303, is stored in the storage area for the web browser 101. Specifically, the data storage control unit 108 stores the update data in the area saved for localStorage and the like. In step S306, the web browser 101 transmits the update data to the web server 1006 in accordance with the instruction from the web application.

The web application operating on the web browser 101 can register processing to be called when the connection status changes from the offline status to the online status, in the web browser 101.

Figure 3B:
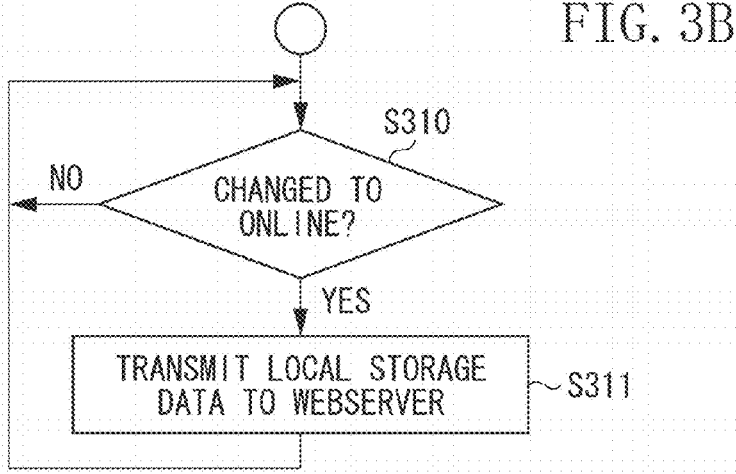

FIG. 3B is a flowchart illustrating an example of the processing registered in the web browser 101 by the web application. In this example, the processing to be called when the connection status changes to the online status is processing of synchronizing the update data, as a result of the editing through the offline work, with the web server 1006.

In step S310, the web application determines whether the connection status has changed to the online status. When the connection status has changed to the online status (Yes in step S310), in step S311 the web application transmits the local storage data to the web server 1006 through the web browser 101. Here, only the update data related to the work in the offline status may be transmitted.

Figure 4:
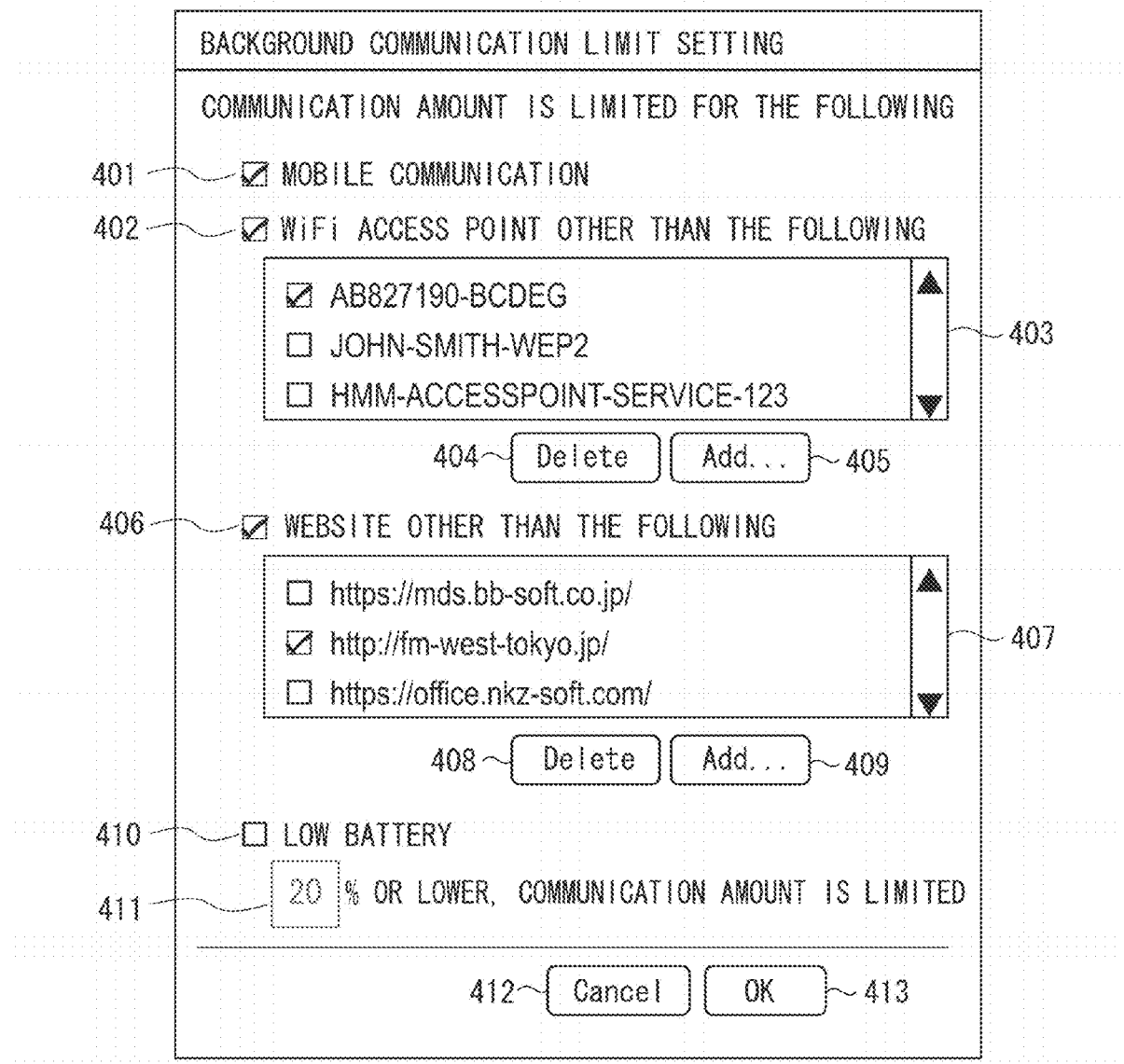
FIG. 4 is a diagram illustrating an example of a screen for performing setting for limiting background communications of the web browser.

FIG. 4 illustrates an example of a setting screen provided by the web browser 101. Here, setting can be performed that is related to transmission of data, through background communications, to an external server (web server 1006 and the like) in response to the change of the connection status to the network described in FIG. 3.

A setting item 401 is a check box for performing setting for limiting the background communications when the mobile communications are performed. When the setting is enabled, the web browser 101 limits the background communications when the mobile communications with LTE or 3G are performed in the online status. Specifically, the web application does not transmit the update data to the web server as described above with reference to FIG. 3.

A setting item 402 is a check box for performing setting for limiting the background communications in accordance with the wireless network, that is, in accordance with the WiFi access point in particular. When the setting is enabled, the web browser 101 limits the background communications when the WiFi communications are performed by connecting to an access point other than an access point that is not on a list 403. A delete button 404 is used for deleting a checked access point from the list 403. An add button 405 is used for additionally registering an access point to the list 403. Upon detecting that the add button 405 is pressed, the web browser 101 displays a screen (not illustrated) for inputting a name of an access point, and adds the input access point to the list 403. The setting method described above is merely an example, and the access points for which the background communications are limited may be managed and set with the list.

A setting item 406 is a checkbox for performing setting for limiting the background communications in accordance with a URL of the web application. When the setting is enabled, the web browser 101 does not limit the background communications relative to a web application when the web application that is executing has a URL starting with any piece of information related to URLs on a list 407. A delete button 408 is used for deleting a checked URL from the list 407. An add button 409 is used for adding and registering a URL to the list 407. Upon detecting that the add button 409 is pressed, the web browser 101 displays a screen (not illustrated) for inputting the URL to be registered, and adds the input URL to the list 407. The setting method described above is merely an example. The URL for which the background communications are limited may be managed and set with the list.

Figure 5:
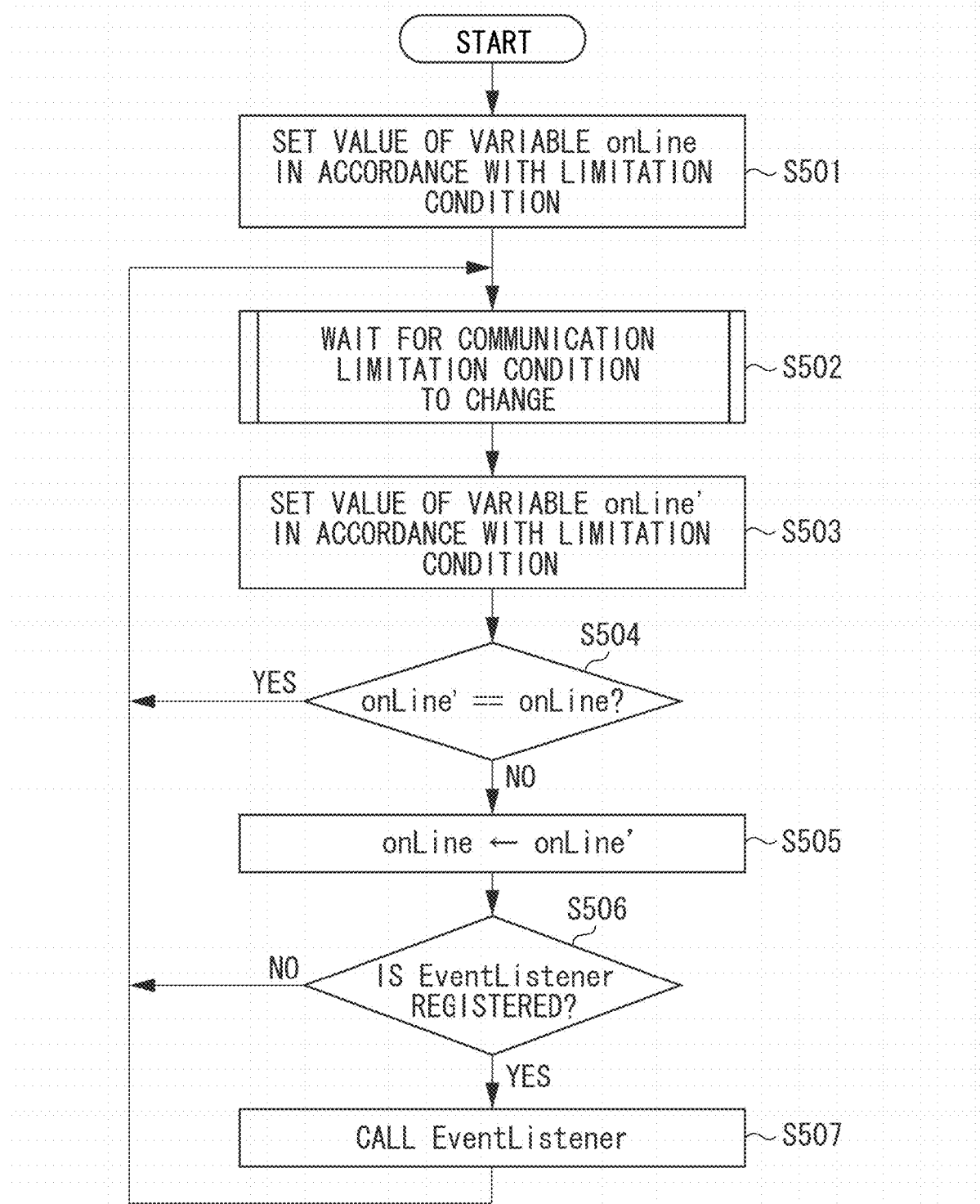
FIG. 5 is a flowchart illustrating processing of limiting the background communications of the web browser.
Figure 6:
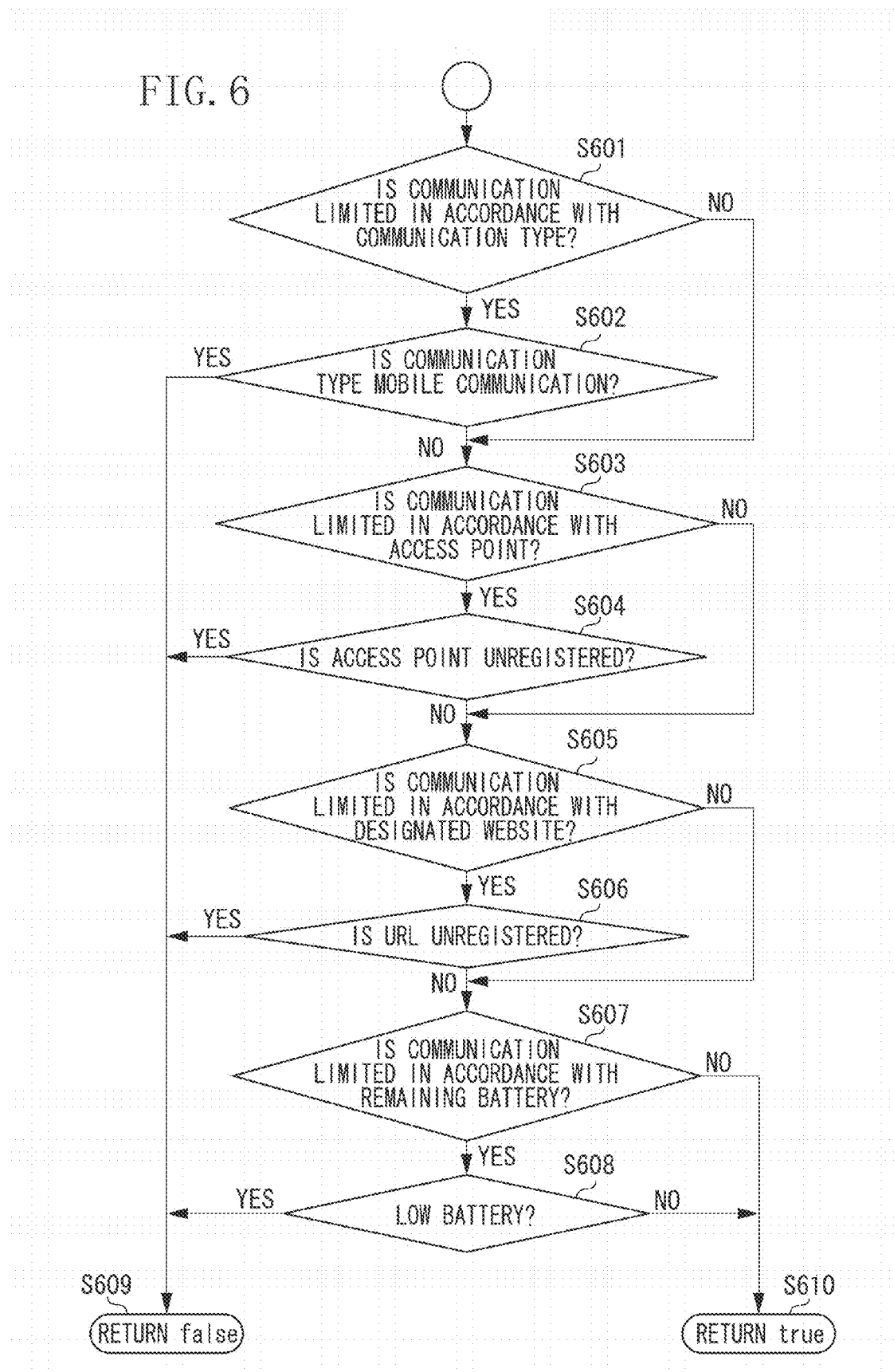
FIG. 6 is a flowchart illustrating determining processing executed by the web browser in accordance with a current status of the information processing terminal.

The web browser 101 may perform setting for not limiting the background communications for the settings related to the setting items 402 and 406 even when the background communications should be limited due to conditions of other setting items. Specifically, the limitation control described below with reference to FIGS. 5 and 6 is not performed, only when the user is using a web application (website) corresponding to the URL on the list 407.

A setting item 410 is a check box for performing setting for limiting the background communications when the remaining amount of the battery of the information processing terminal 201 on which the web browser 101 operates, drops below a designated value. When the setting is enabled, the web browser 101 limits the background communications, if the remaining level of the battery 212, with which the information processing terminal 201 is driven, drops below the remaining battery level designated with an input box 411.

A cancel button 412 is used for abandoning the setting values modified on the screen. Upon detecting that the cancel button 412 is pressed, the web browser 101 closes the screen without executing any processing. An OK button 413 is used for storing the setting values modified on the screen. Upon detecting that the OK button 413 is pressed, the web browser 101 stores the setting values on the screen in the storage device 205, and reflects the setting values on an operation setting of the web browser 101 currently under operation. Upon being started, the web browser 101 reads the setting values stored in the storage device 205 and limits the background communications in accordance with the setting values.

Setting items other than those in FIG. 4 may be prepared. For example, a setting item may be prepared for performing setting for limiting the background communications in the case of a communication type and a topology related to communications involving charging or with an upper limit communication amount. Here, the web browser 101 determines that the communication involves charging or a communication amount with an upper limit, and then limits the background communications through processing described below.

FIG. 5 is a flowchart illustrating processing executed by the web browser 101 to limit the background communications. The web browser 101 generates an instance of the interpreter 107 and starts the instance, when reading a webpage of a website designated with the UI 102 and the like.

In step S501, the interpreter 107 determines whether the current status of the information processing terminal 201 satisfies a condition for limiting the background communications (hereinafter, referred to as a limitation condition) in accordance with a content of the setting performed through the screen illustrated in FIG. 4. The processing in this step is described below in detail with reference to FIG. 6. The interpreter 107 sets a true or false value to a variable window.navigator.onLine (variable onLine in the figure) in accordance with the result of determination processing in FIG. 6. Specifically, "false" is set to the variable window.navigator.onLine when the limitation condition is satisfied.

Next, in step S502, the interpreter 107 waits for change of the limitation condition as a result of setting change on the screen illustrated in FIG. 4, or change of the connection status of the information processing terminal 201 to the network. The processing proceeds to step S503, when any one of the changes is detected.

In step S503, the interpreter 107 executes the determination processing illustrated in FIG. 6 based on the current connection status of the information processing terminal 201 and the limitation condition, and sets a resultant value to a temporary variable onLine' (variable onLine' in the figure). A true or false value is set to the temporary variable onLine' in accordance with whether the limitation condition is satisfied as in step S501.

In step S504, the interpreter 107 compares the value of the temporary variable onLine' with the value of the window.navigator.onLine. The processing proceeds to step S502 when the result of the comparison indicates that the values are the same (Yes in step S504), and proceeds to step S505 when the result of the comparison indicates that the values are different (No in step S504). In step S505, the interpreter 107 substitutes the value of the window.navigator.onLine with the value of the temporary variable onLine'.

In step S506, the interpreter 107 checks whether an EventListener has been registered for the window.navigator.onLine. The EventListener is a JavaScript (registered trademark) program for referring to and controlling the value of the window.navigator.onLine. The EventListener is registered by the web application (website) operating on the web browser 101. When the EventListener is not registered (No in step S506), the processing proceeds to step S502. When the EventListener is registered (Yes in step S506), the interpreter 107 sequentially calls the registered EventListeners in step S507, and then the processing proceeds to step S502.

Here, a case is described where the processing corresponding to the EventListener is processing of transmitting the local storage data to the web server 1006 when the connection status changes to the online status from the offline status. In this case, it is determined that the connection status has changed to the online status from the offline status, when the value of the window.navigator.onLine is substituted with the value true in step S505, and the transmission processing for the web server 1006 is executed in accordance with the EventListener called in step S507.

The web browser 101 limits the background communications by controlling the value of the window.navigator.onLine, whereby the processing of limiting the background communications is implemented. Thus, only the JavaScript (registered trademark) program that operates by referring to the true or false value of the variable, is affected by the limitation on the background communications, while normal website browsing processing executed by the web browser 101 is unaffected by the limitation processing.

FIG. 6 is a flowchart illustrating the determination processing executed by the web browser 101 in steps S501 and S503. The value of the variable used for implementing the limiting processing for the background communications is determined with this processing.

In step S601, the interpreter 107 determines whether the setting item 401 illustrated in FIG. 4 is enabled. The setting item 401 is merely an example. In this step, whether the setting for limiting the background communications in accordance with the communication type related to the network connection of the information processing terminal 201 is activated, is determined. The processing proceeds to step S602 when the setting is enabled (Yes in step S601) and proceeds to step S603 when the setting is disabled (No in step S601).

In step S602, the interpreter 107 determines whether the communication type related to the network connection of the information processing terminal 201 is the mobile communications. The processing proceeds to step S609 when the communication type is the mobile communications (Yes in step S602), and proceeds to step S603 when the communication type is not the mobile communications (No in step S602). Specifically, in step S602, the interpreter 107 determines whether the current communications are the mobile communications in a physical layer of an OSI reference model.

In step S603, the interpreter 107 determines whether the setting item 402 illustrated in FIG. 4 is enabled. The setting item 402 is used for performing setting for limiting the background communications based on a designated WiFi access point. The processing proceeds to step S604 when the setting is enabled (Yes in step S603), and proceeds to step S605 when the setting is disabled (No in step S603).

In step S604, the interpreter 107 determines whether the WiFi access point, currently accessed by the information processing terminal 201, is registered on the list 403. The processing proceeds to step S609 when the result of the determination indicates that the WiFi access point is unregistered (Yes in step S604), and proceeds to step S605 when the result indicates otherwise (No in step S604). This determination is made when the type of communications, currently performed by the information processing terminal 201, is the WiFi communications in a physical layer.

In step S605, the interpreter 107 determines whether the setting item 406 illustrated in FIG. 4 is enabled. The setting item 406 is used for performing setting for limiting the background communications based on a designated website. The processing proceeds to step S606 when the setting item 406 is enabled (Yes in step S605), and proceeds to step S607 when the setting item 406 is in disabled (No in step S605).

In step S606, the interpreter 107 determines whether a URL character string corresponding to the currently executed web application starts from any one of a group of URLs registered on the list 407. The processing proceeds to step S609 when the result of the determination indicates that the URL character string is unregistered on the list 407 (Yes in step S606), and proceeds to step S607 when the result indicates otherwise (No in step S606).

In step S607, the interpreter 107 determines whether the setting item 410 illustrated in FIG. 4 is enabled. The setting item 410 is used for performing setting for limiting the background communications in accordance with the remaining battery level. The processing proceeds to step S608 when the setting item 410 is enabled (Yes in step S607), and proceeds to step S610 when the setting item 410 is disabled (No in step S607) or when the interpreter 107 determines that the information processing terminal 201 is not driven by the rechargeable battery 212.

In step S608, the interpreter 107 compares the current remaining level of the rechargeable battery 212 with a threshold designated in the input box 411 in FIG. 4. The processing proceeds to step S609 when the current remaining amount of the battery is equal to or lower than a threshold, i.e., the current remaining amount of the battery is small (Yes in step S608), and proceeds to step S610 when the current remaining amount of the battery is not equal to or lower than the threshold (No in step S608).

In step S609, the interpreter 107 returns false, that is, sets false to the value of the variable window.navigator.onLine, and terminates the processing. Thus, the JavaScript (registered trademark) program, referring to the value of the variable, limits the background communications. On the other hand, in step S610, the interpreter 107 returns true and terminates the processing.

In the present embodiment, the determination processing in steps S603 and S604 or in steps S605 and S606 may be executed first in the processing of the flowchart in accordance with the setting in the web browser 101, and the processing may proceed to step S610 when the result of the determination processing in step S604 or S606 is "No". Thus, the processing of synchronizing the local storage data through the background communications can be executed in accordance with the information managed on the list 403 or the list 407, regardless of the communication type and the remaining amount of the battery.

Furthermore, there might be an exceptional case where the background communications should be performed even when the result of the determination processing in steps S601 and S602 or in steps S607 and S608 is "Yes". Specifically, this case occurs when the current access destination of the web browser 101 is managed on the list 403 or the list 407. Thus, in the processing in the flowchart illustrated in FIG. 6, the determination processing in step S604 or step S606 may be executed when the result of the determination processing in step S602 or S608 is "Yes", and the processing may proceed to step S610 when the result of the determination processing in step S604 or step S606 is "No".

A feature of a second embodiment lies in the following function. Specifically, the setting for limiting the background communications is changed through a display (UI 102) for the web browser 101 different from that in the first embodiment. The control functions according to the first and the second embodiments may be provided for a single web browser.

Figure 7A:
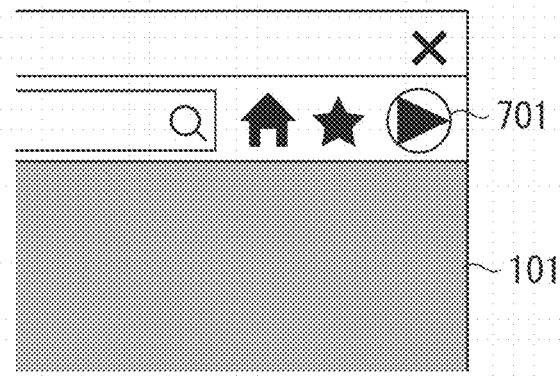
FIGS. 7A and 7B are diagrams illustrating examples of values of a variable online displayed by the web browser.
Figure 7B:
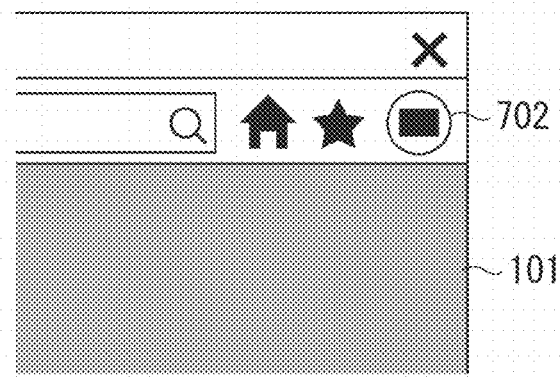

FIGS. 7A and 7B illustrate examples of an icon representing the value of the variable window.navigator.onLine (hereinafter, referred to as variable onLine) currently set on the UI 102 of the web browser 101. In the present embodiment, examples where the icon is displayed next to an address bar or a search bar of the web browser 101 is described. A state display icon 701 in FIG. 7A indicates that true is the value of the variable onLine by the web browser 101, whereas a state display icon 702 in FIG. 7B indicates that false is the value of the variable onLine.

Figure 8A:
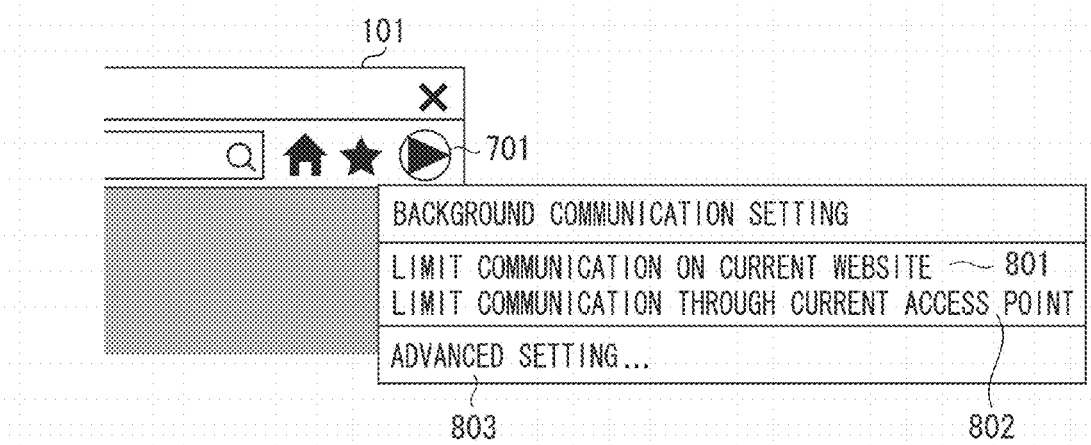
FIGS. 8A and 8B are diagrams illustrating displayed examples of menus for performing limit setting.
Figure 8B:
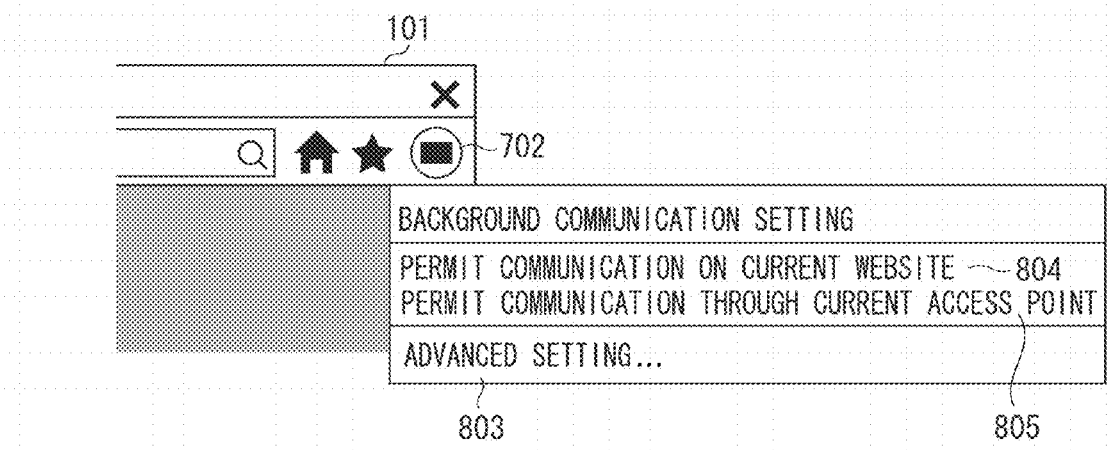

FIGS. 8A and 8B illustrate examples of a menu displayed when the user presses the state display icons 701 and 702 in FIGS. 7A and 7B, respectively.

A menu item 801 in FIG. 8A is used for performing setting for limiting the background communications on the URL corresponding to the currently accessed web application (or website). The web browser 101 displays the menu item 801 to be selectable when the following condition is satisfied.

Condition 1: The currently performed communications are the mobile communications in the physical layer, the setting item 406 illustrated in FIG. 4 is enabled, and the URL corresponding to the currently accessed web application (or website) starts from any one of the URLs registered on the list 407.

Upon detecting that the menu item 801 is selected, the web browser 101 deletes the corresponding URL from the list 407.

A menu item 802 in FIG. 8A is used for performing setting for limiting the background communications through a current access point. The web browser 101 displays the menu item 802 to be selectable when the current value of the variable onLine is true, and when any one of the following conditions is satisfied.

Condition 1: The setting item 402 illustrated in FIG. 4 is disabled.

Condition 2: The setting item 402 illustrated in FIG. 4 is enabled, the current communications are the WiFi communications in the physical layer, and the current access point is on the list 403.

Upon detecting that the menu item 802 is selected, the web browser 101 enables the setting item 402 when the setting item 402 is disabled, and deletes information on the corresponding current access point from the list 403.

A menu item 803 in FIG. 8A is used for opening the setting screen illustrated in FIG. 4. Upon detecting that the menu item 803 is selected, the web browser 101 opens the setting screen illustrated in FIG. 4.

A menu item 804 in FIG. 8B is used for performing setting to permit the background communications on the URL corresponding to the currently accessed web application (or website). The web browser 101 displays the menu item 804 to be selectable when the following condition is satisfied.

Condition 1: The current communications are the mobile communications in the physical layer, the setting item 406 in FIG. 4 is enabled, and the URL corresponding to the currently accessed web application (or website) does not start from any of the URLs registered on the list 407. Upon detecting that the menu item 804 is selected, the web browser 101 opens a screen (FIG. 9) for registering the URL of the current website on the list 407.

Figure 9:
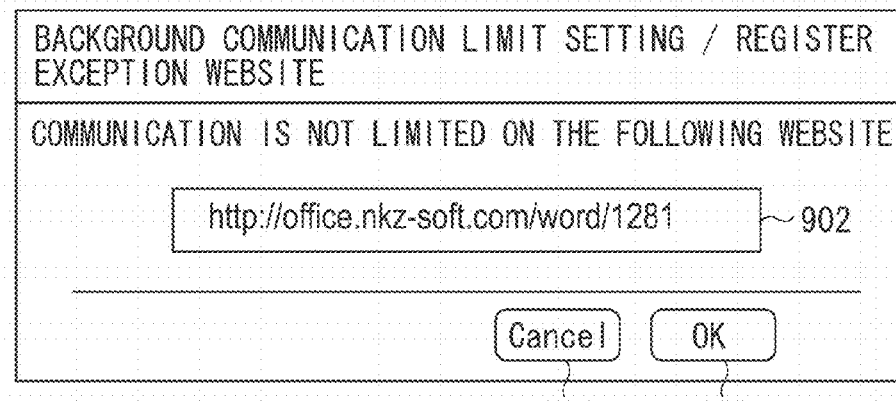
FIG. 9 is a diagram illustrating an example of a registering screen related to the limit setting.

FIG. 9 illustrates an example of a screen for newly adding a URL to the list 407. The web browser 101 displays a registration screen 901 upon detecting that the menu item 804 illustrated in FIG. 8B is selected. In a text box 902, information on the URL to be registered is input. An initial value in the text box 902 is the URL of the website currently displayed by the web browser 101 or the like. With the text box 902, for example, the user can delete part of the information (latter part of the information), that is, edit the information, to input the desired information.

Upon detecting that a button 903 is pressed, the web browser 101 additionally registers the information on the URL input in the textbox 902 in the list 407, and closes the screen 901. Upon detecting that a button 904 is pressed, the web browser 101 closes the screen 901 without registering any information.

A menu item 805 in FIG. 8B is used for performing setting for permitting the background communications through the current access point. The web browser 101 displays the menu item 805 to be selectable when the following condition is satisfied.

Condition 1: the current value of the variable online is false, the current communications are the WiFi communications in the physical layer, and the current access point is not on the list 403.

Upon detecting that the menu item 805 is selected, the web browser 101 adds the current access point to the list 403.

Other Embodiments

The present invention includes an apparatus or a system formed by appropriately combining the embodiments described above, or a method of using the apparatus or the system.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2014-091809 filed Apr. 25, 2014, which is hereby incorporated by reference herein in its entirety.

What is claimed is:

1. An information processing terminal on which a web browser, having functions of storing data related to a web application in a storage area for the web browser and managing a reference value indicating a status of network connection, operates, the information processing terminal comprising,
a memory storing instructions related to the web browser; and
a processor for executing the instructions causing the information processing terminal to:
set a limitation condition for limiting a transmission of update data related to the web application in the storage area to a server providing the web application;
manage, as the reference value managed by the web browser, a first value indicative of non-connection when a status of the network connection of the information processing terminal is offline;
determine a value to be managed as the reference value when the status of the network connection of the information processing terminal has changed to online from the offline, wherein a second value indicative of connecting is determined as the reference value in a case where the set limitation condition is not satisfied, and
automatically set the determined value as the reference value,
wherein, in a case where the reference value indicates the second value, the update data is transmitted to the server from the information processing terminal based on scripts corresponding to the web application that is run on the web browser of the information processing terminal,
wherein, even if the status of the network connection of the information processing terminal is online, the first value is determined as the reference value in a case where the set limitation condition is satisfied, and
wherein, in a case where the reference value indicates the first value, the transmission of the update data based on the scripts is not performed but browsing processing by the web browser without referring to the reference value is unaffected by a change of the reference value.

2. The information processing terminal according to claim 1, wherein the transmission of the update data to the server is transmission processing executed on a background of browsing processing related to the web application executed by the web browser.

3. The information processing terminal according to claim 1, wherein, as the limitation condition, a condition related to a connection type used for the network connection of the information processing terminal is set.

4. The information processing terminal according to claim 1, wherein, as the limitation condition, a condition related to an access point used for the network connection of the information processing terminal is set.

5. The information processing terminal according to claim 1, wherein, as the limitation condition, a condition related to information on a URL corresponding to the web application is set.

6. The information processing terminal according to claim 1, wherein, as the limitation condition, a condition related to a remaining amount of a battery of the information processing terminal is set.

7. The information processing terminal according to claim 1, wherein, as the limitation condition, a condition related to a communication involving charging and a communication with an upper limit communication amount is set.

8. The information processing terminal according to claim 1, wherein the limitation condition related to the information corresponding to the web application is set on a screen on which information related to the web application is displayed by the web browser.

9. The information processing terminal according to claim 1, wherein the update data includes data on at least one of localStorage and IndexedDB capable of being edited by the web browser regardless of the status of the network connection of the information processing terminal.

10. A control method for a web browser having functions of storing data related to a web application in a storage area prepared for a storage device for the web browser and managing a reference value indicating a status of network connection, the control method comprising:
setting a limitation condition for limiting a transmission of update data related to the web application in the storage area to a server providing the web application;

managing, as the reference value managed by the web browser, a first value indicative of non-connection when a status of the network connection of the information processing terminal is offline;

determining a value to be managed as the reference value when the status of the network connection of an information processing terminal has changed to online from the offline, wherein a second value indicative of connecting is determined as the reference value in a case where the set limitation condition is not satisfied, and automatically setting the determined value as the reference value, wherein, in a case where the reference value indicates the second value, the update data is transmitted to the server from the information processing terminal based on scripts corresponding to the web application that is run on the web browser of the information processing terminal, wherein, even if the status of the network connection of the information processing terminal is online, the first value is determined as the reference value in a case where the set limitation condition is satisfied, and wherein, in a case where the reference value indicates the first value, the transmission of the update data based on the scripts is not performed but browsing processing by the web browser without referring to the reference value is unaffected by a change of the reference value.

11. The control method according to claim 10, wherein the transmission of the update data to the server is transmission processing executed on a background of browsing processing related to the web application executed by the web browser.

12. The control method according to claim 10, wherein, as the limitation condition, a condition related to a connection type used for the network connection of the information processing terminal is set.

13. The control method according to claim 10, wherein, as the limitation condition, a condition related to an access point used for the network connection of the information processing terminal is set.

14. The control method according to claim 10, wherein, as the limitation condition, a condition related to information on a URL corresponding to the web application is set.

15. The control method according to claim 10, wherein, as the limitation condition, a condition related to a remaining amount of a battery of the information processing terminal is set.

16. The control method according to claim 10, wherein, as the limitation condition, a condition related to a communication involving charging and a communication with an upper limit communication amount is set.

17. The control method according to claim 10, wherein, the limitation condition related to the information corresponding to the web application is set on a screen on which information related to the web application is displayed by the web browser.

18. The control method according to claim 10, wherein the update data includes data on at least one of localStorage and IndexedDB capable of being edited by the web browser regardless of the status of the network connection of the information processing terminal.

19. A non-transitory computer readable storage medium on which is stored a computer program for making a computer execute a control method based on a web browser having functions of storing data related to a web application as local storage data in a storage area prepared for a storage device for the web browser and managing a reference value indicating a status of network connection, the method comprising:

setting a limitation condition for limiting a transmission of the local storage data to a server providing the web application;

managing, as the reference value managed by the web browser, a first value indicative of non-connection when a status of the network connection of the information processing terminal is offline;

determining a value to be managed as the reference value when the status of the network connection of the computer has changed to online from the offline, wherein a second value indicative of connecting is determined as the reference value in a case where the set limitation condition is not satisfied, and automatically setting the determined value as the reference value, wherein, in a case where the reference value indicates the second value, the update data is transmitted to the server from the information processing terminal based on scripts corresponding to the web application that is run on the web browser of the information processing terminal, wherein, even if the status of the network connection of the information processing terminal is online, the first value is determined as the reference value in a case where the set limitation condition is satisfied, and wherein, in a case where the reference value indicates the first value, the transmission of the update data based on the scripts is not performed but browsing processing by the web browser without referring to the reference value is unaffected by a change of the reference value.

* * * * *